Aug. 22, 1933.   C. M. EVANS   1,923,971
WIND HARNESS FOR ELECTRIC ENERGY
Filed March 9, 1932   5 Sheets-Sheet 4
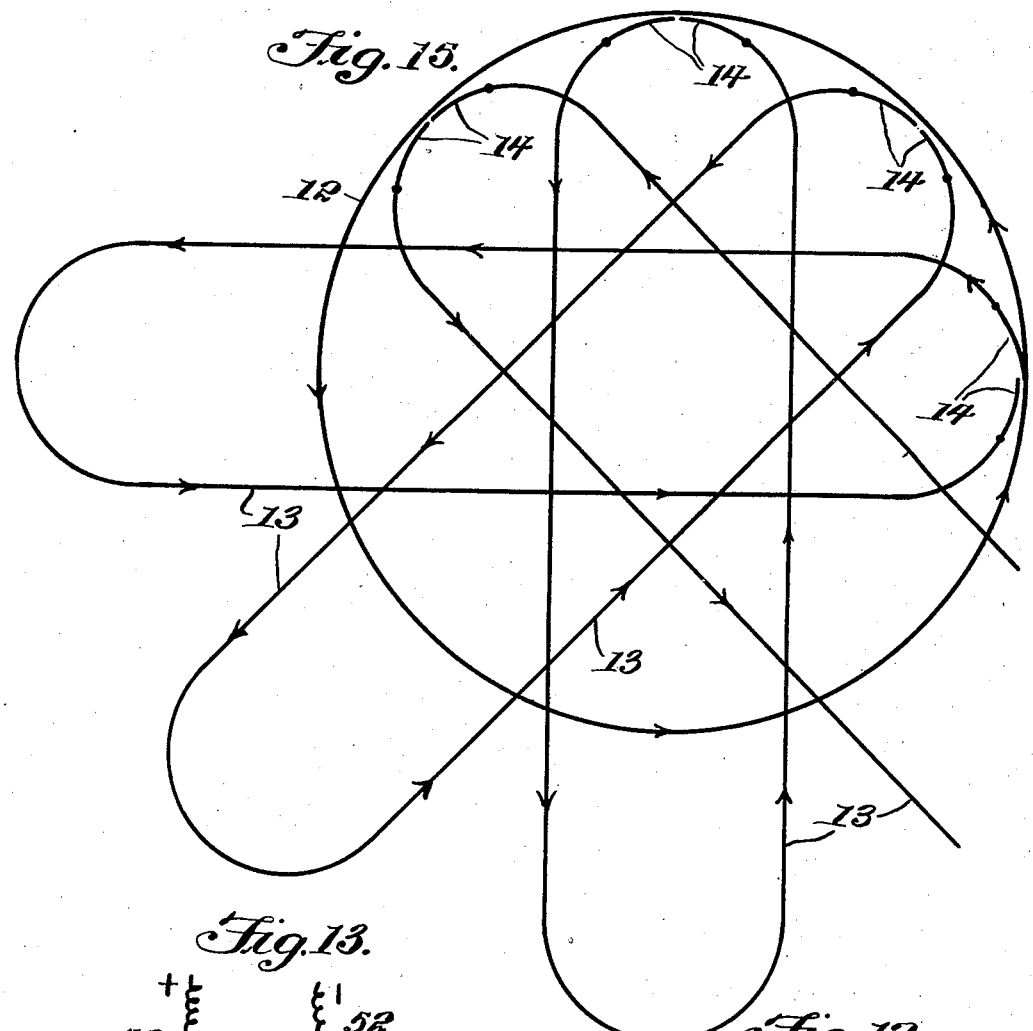
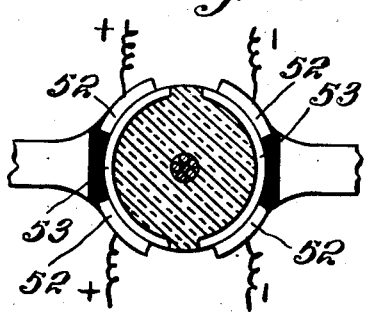
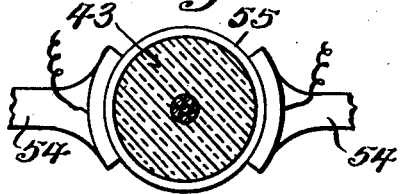
Clyde M. Evans
INVENTOR
BY Victor J. Evans & Co.
ATTORNEY
WITNESS J. T. L. Wright

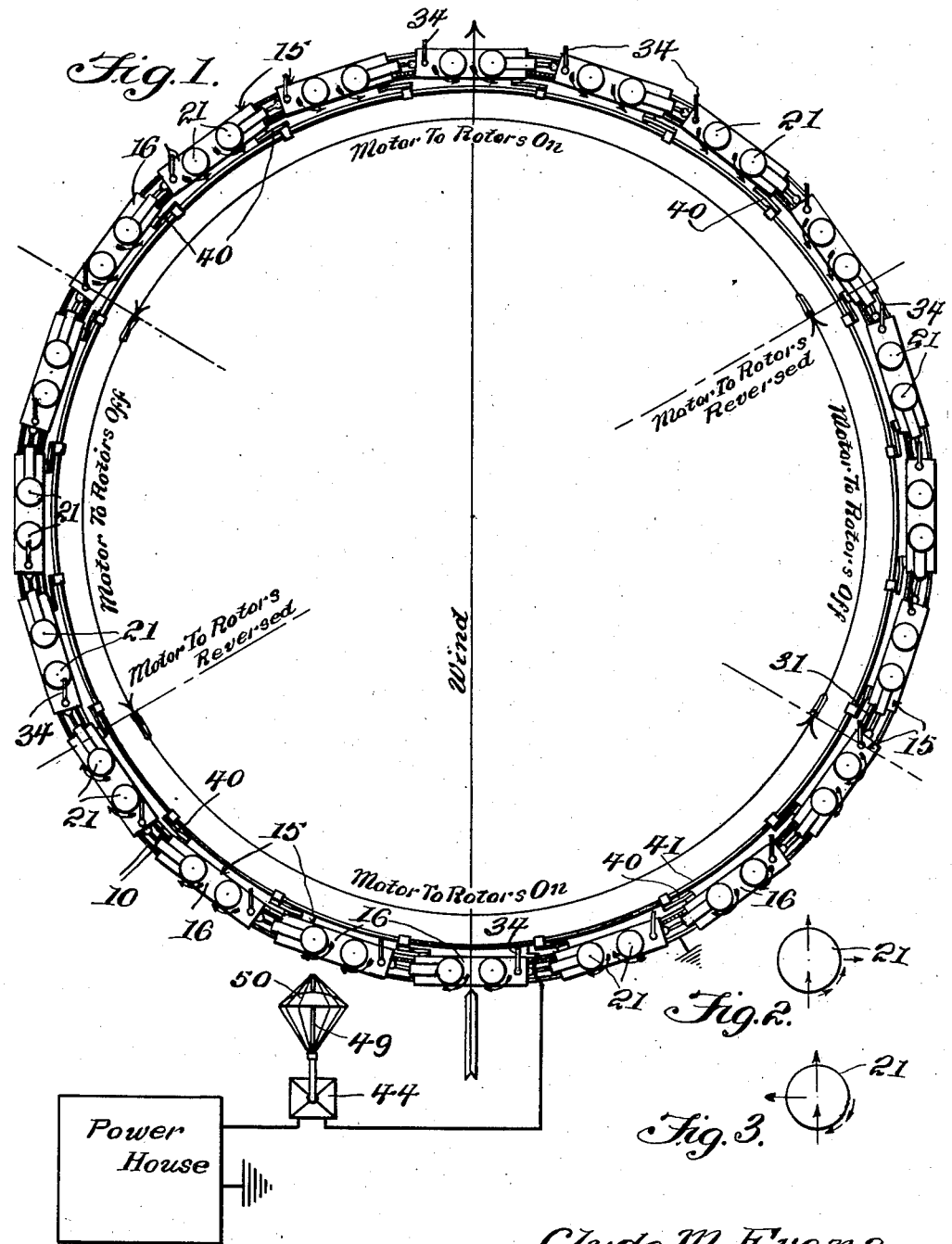

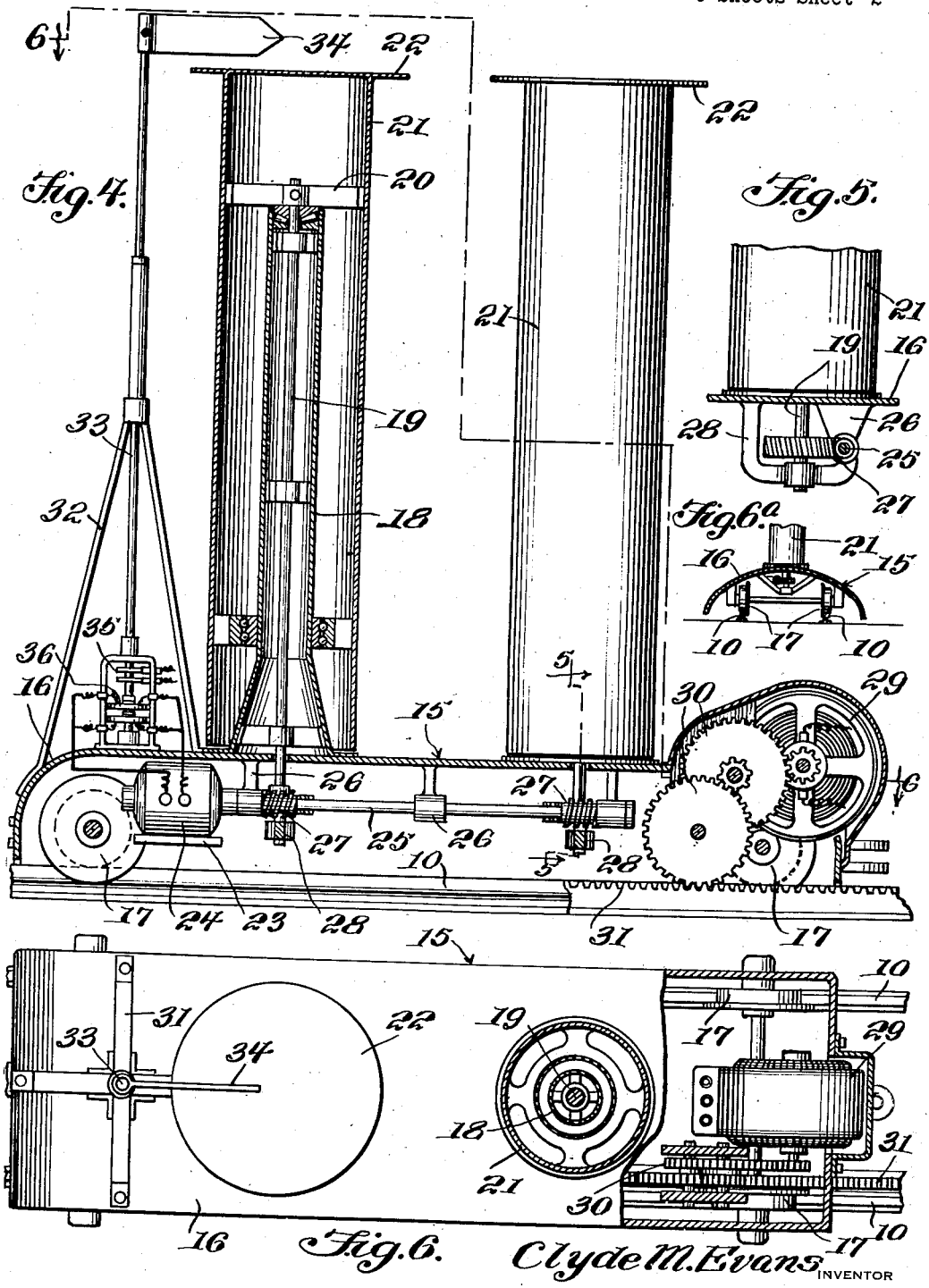

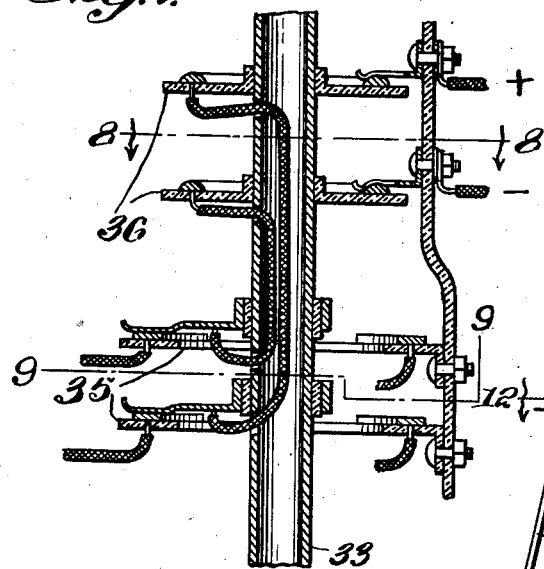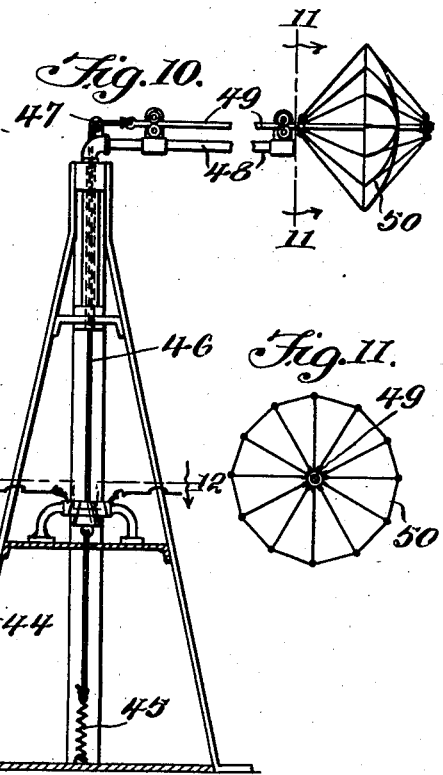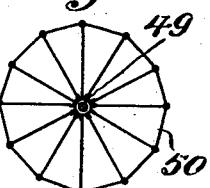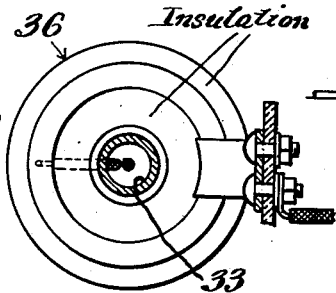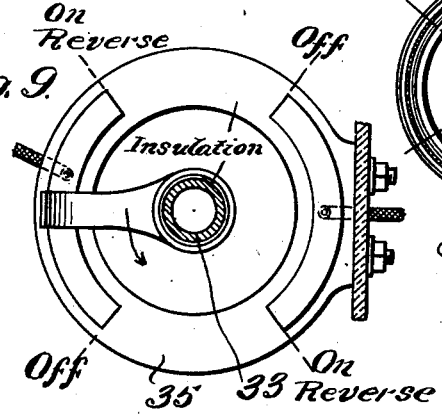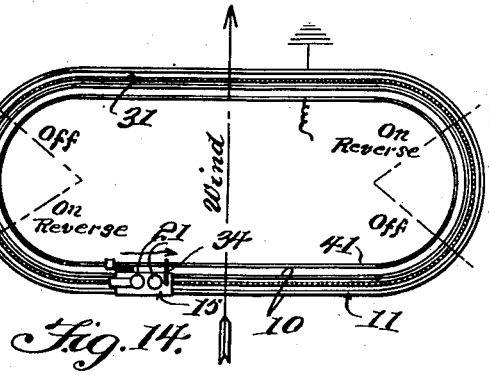

Fig. 16.

Patented Aug. 22, 1933

1,923,971

UNITED STATES PATENT OFFICE 1,923,971

WIND HARNESS FOR ELECTRIC ENERGY

Clyde M. Evans, Perkins, Okla.

Application March 9, 1932. Serial No. 597,783

7 Claims. (Cl. 290—4)

The invention relates to an electro-mechanical roundabout power generating apparatus and more particularly to a wind harness for electric energy.

The primary object of the invention is the provision of an apparatus of this character, wherein a plurality of movable vehicles are adapted to travel in a circuitous course and these vehicles carry rotors adapted to be spun in the wind for rightangular displacement to the course of the breeze, thereby through an electric equipment to generate electric energy and supply the same to a distributing station whereby such energy may be utilized for power.

Another object of the invention is the provision of an apparatus of this character wherein the electric equipment in use therewith is of a kind to automatically shut off spinning action to the rotors when the vehicles are moving or traveling parallel to the wind or breeze course and in this fashion conserve electric current during such areas of travel of the vehicles and also the rotors will be reversed at diametrically opposite areas intersecting the direction or course of the wind or breeze, so that a continuous travel of the vehicles will be maintained by the wind or breeze.

A further object of the invention is the provision of an apparatus of this character wherein the vehicles moving at a fixed speed under automatic control will build an electric current to be collected by a third rail and conducted to a point or locality for distribution as a power source, the vehicles being driven by wind or breeze and moved in a circuitous path so that the rotors upon the vehicles will be spun in the wind or breeze causing the said vehicles to travel at rightangles or substantially so to the breeze or wind and this momentum operating the electrical equipment for the generation of electricity for external power purposes.

A still further object of the invention is the provision of an apparatus of this character wherein the third rail lead to the power distributing source and in electric circuit with the motors of the vehicles is automatically opened and closed under the operation of a windfoil or parachute operative by wind or breeze so that when the atmosphere is devoid thereof the apparatus will be dormant or inoperative, thus the said apparatus active only on the presence of wind or breeze.

A still further object of the invention is the provision of an apparatus of this character which is comparatively simple in construction, thoroughly reliable and efficient in its operation, novel in form, entirely automatic in the working thereof, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a diagrammatic plan view of the apparatus constructed in accordance with the invention illustrating the direction of travel, the motor active and motor shut-off areas and the reversing zones of the spinning cylinders of such apparatus.

Figure 2 is a view showing diagrammatically the rotation of a rotor in one direction.

Figure 3 is a similar view showing the rotation of the rotor in a reverse direction.

Figure 4 is a fragmentary vertical longitudinal sectional view through one of the vehicles of the apparatus.

Figure 5 is a fragmentary sectional view on the line 5—5 of Figure 4 looking in the direction of the arrows.

Figure 6 is a top plan view of one vehicle partly in section, the section being approximately on the line 6—6 of Figure 4 looking in the direction of the arrows.

Figure 6a is a fragmentary transverse sectional view through one of the vehicles showing streamline formation thereof.

Figure 7 is a fragmentary sectional view in detail of the combined cut-out and reversing switches of the electrical equipment.

Figure 8 is a sectional view on the line 8—8 of Figure 7 looking in the direction of the arrows.

Figure 9 is a sectional view on the line 9—9 of Figure 7 looking in the direction of the arrows.

Figure 10 is an elevation partly in section of the parachute or windfoil stand.

Figure 11 is a sectional view on the line 11—11 of Figure 10 looking in the direction of the arrows.

Figure 12 is a sectional view on the line 12—12 of Figure 10 looking in the direction of the arrows.

Figure 13 is a view similar to Figure 12 showing a slight modification thereof.

Figure 14 is a diagrammatic plan view of a modified form of trackage for the apparatus.

Figure 15 is a view similar to Figure 14 showing a still further modified form of trackage.

Figure 16 is a diagrammatic view of the electrical equipment and the circuits layout thereof for the apparatus.

Similar reference characters indicate corresponding parts throughout the several views in the drawings.

Referring to the drawings in detail, the apparatus preferably includes a continuous track 10, in one instance following a circular bed, although it may be of a course simulating an oval path as at 11 in Figure 14 or may include the circular track 12 and a series of oval tracks 13, these branching from the circular track 12 and communicative through suitable switches 14 as diagrammatically illustrated in Figure 15 and upon the track 10 is adapted to travel a train composed of a series of coupled vehicles 15, each including a truck body 16 having journaled therein the rail traction wheels 17 for travel upon the track 10, the wheels being disposed fore and aft of the truck and this truck is preferably of streamline body formation.

Upon each truck 16 and rising vertically therefrom are spaced tubular columns or posts 18 in each of which is centrally journaled in any suitable manner a shaft 19, the latter having connection through the medium of a spider 20 with a spun rotor cylinder 21 having a flat disk-like top or cover 22, it being apparent that each vehicle is equipped with a pair of spaced rotors or cylinders 21.

Within the truck 16 and supported upon any suitable form of rest 23 is an electric motor 24 having its drive shaft 25 journaled in bearings 26 in said truck, the shaft 25 being provided with worm gear connection 27 with the shaft 19 for the rotors or cylinders 21 so that when the motor 24 is operated the rotors or cylinders 21 will be spun. Each shaft 19 preferably has its lower end journaled in the hanger or bracket 28 in which the shaft 25 is journaled.

Each truck 16 has suitably mounted therein an electric generator 29 operatively connected through a train of gears 30 with a rack rail 31 constituting a part of the track 10 so that when the truck 16 travels the generator 29 will be positively driven or operated.

Figure 16:
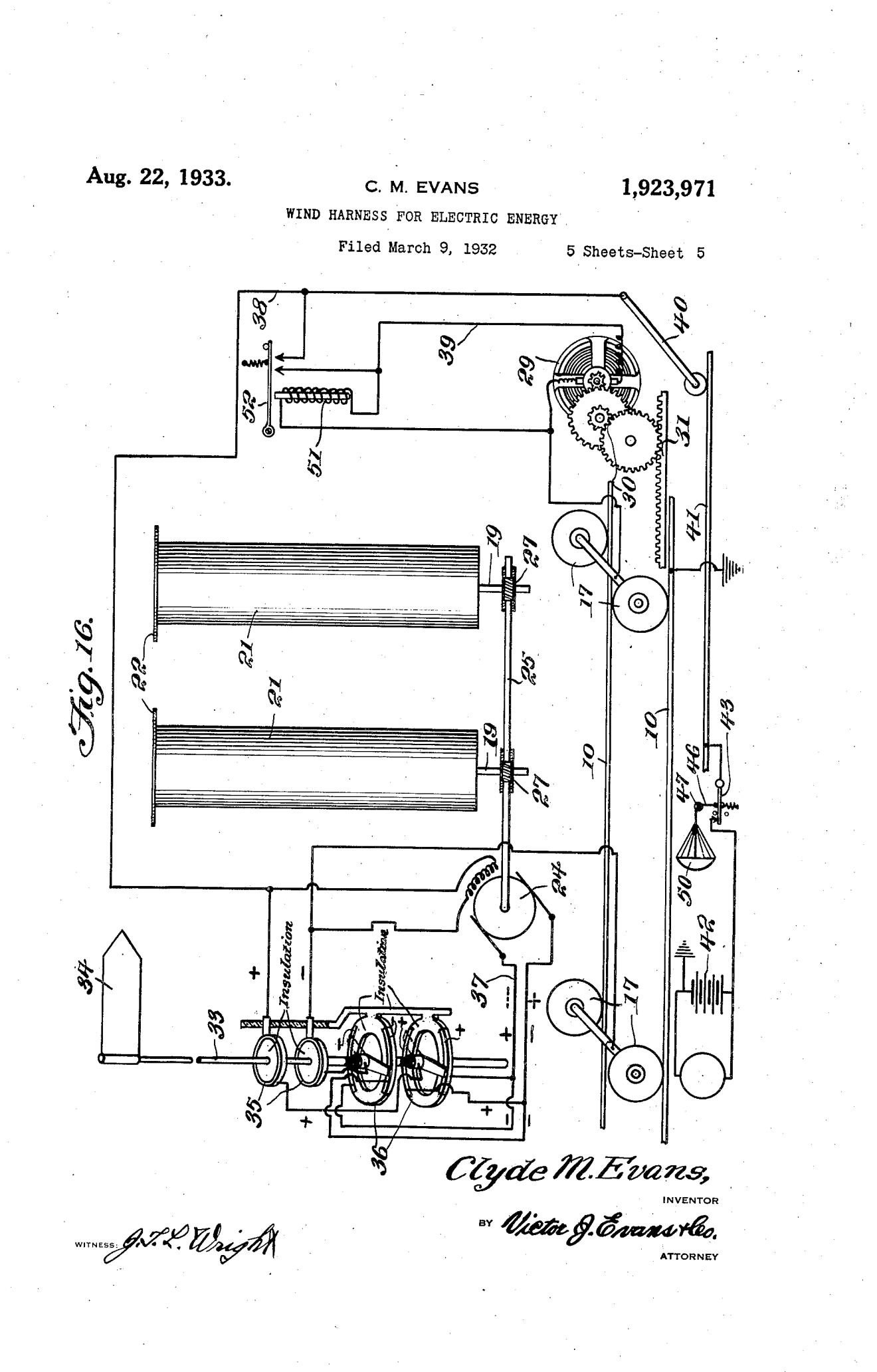

As will appear from Figure 16 of the drawings there is mounted upon each truck a tower 32 in which is journaled the vertical staff 33 of a wind vane 34 and this staff 33 has associated therewith the combination electric circuit reversing and period cut-offs including the members 35 and 36 respectively arranged in the motor circuit 37 for the motor 24, the third rail circuit 38 and the generator circuit 39 for the generator 29, the third rail circuit 38 including the third rail brush or contact 40 traveling upon a third rail 41 as a part of the track 10 and has connection with a source of current supply 42 located at a substation or power distributing plant. The connection of the third collector rail 41 includes a switch 43, the latter being arranged in a stand 44 at the source of electric power supply or the substation and this switch 43 is normally open under the action of a spring 45 and has connection with a pull cable 46 trained over suitable guide pulleys 47 upon a swinging crane or arm 48 extending at right angles to the stand 44 and journaled for rotation with respect thereto, the cable being connected to the stem 49 of a parachute or windfoil 50 which is preferably umbrella-shaped and is movable with the wind or breeze, it being rigidly fixed upon the sliding rod and serves as a wind vane. Upon movement of the parachute or windfoil in one direction the circuit is closed through switch 43 and likewise the third rail circuit 38.

Included in the generator circuit 39 is an electric magnet 51 which when energized upon the closing of said generator circuit 39 will operate a switch 52 for the communication of the generator circuit with the third rail circuit 38 so that current built up by the generator 29 will be fed to the third rail 41 and then to the distributing substation or current supply 42 for power purposes or power distribution.

The details of the switch 43 are shown in Figure 12 of the drawings while in Figure 13 there is a slight deviation or modification thereof wherein there are arranged opposed pairs of contacts 52, these engageable with a split contact ring 53, while in Figure 12 there is but a single pair of opposed contacts 54 and an unbroken ring contact 55.

In the operation of the apparatus assuming that there is wind or breeze, the switch 43 being normally open is automatically closed by the action of said wind or breeze, assuming that the direction thereof is as indicated by the arrow in Figure 1 of the drawings, the parachute or windfoil 50 will be affected for this automatic closing of the switch 43 thereby closing circuit 38 through the combination electric circuit reversing and period cut-offs to the motor 24, the current from the source of supply 42 will start said motor 24, driving the rotors or cylinders 21, causing them to spin in the wind or breeze so that the vehicles 15 will be started in their travel upon the track 10, the action of the spun rotors or cylinders 21 causes effectiveness of the wind thereon at right angles to the course or direction of the wind, thus moving the train in one direction upon said track 10. The instant the train is set in motion the generator 29 operates, setting up a current in the circuit 39 thereof, energizing the magnet 51 and attracting the switch arm 52, thus opening the circuit 39 into the third rail circuit 38 which conducts the current generated by the generator 29 to the source of supply 42 whence it is distributed or utilized as power. Concurrently therewith the motor 24 is active until the train 15 enters an area of the track 10 whereby such train will travel parallel with the course of the wind or breeze, then the combination electric circuit reversing and period cut-offs operate to cut out the motor circuit 37 and stop the motor 24 and this action is controllable by the wind vane 34 which regulates the combination electric circuit reversing and period cut-offs for this purpose until the train in its continued travel enters a path intersecting the course of the wind or breeze whence the motors of the trucks will become active again with the rotors or cylinders 21 on the trucks of the train at diametrically opposite points of the track 10 reversely operated. Thus it will be seen that when the rotors or cylinders 21 are inactive at the time that the trucks of the train 15 are traveling parallel with the wind or breeze the impact of such wind or breeze will force along those trucks which are traveling with the wind while the cylinders or rotors 21 of the trucks intersecting the course of the wind or breeze active by the motors will be spun for a push and pull action of all of the trucks. In this manner it should be apparent that when the train is traveling parallel with the wind or breeze there is no utilization for motor activity of those upon the parallel traveling truck and thus conserve electric energy and at the same time generating or building up current for power distribution under the operation of the apparatus.

What is claimed is:—

1. In a wind harness of the character described, a fixed circuitous course, a plurality of spinning rotors movable over the course, electric generating mechanism associated with the rotors, wind controlled switch mechanism operated with the generator mechanism, a motor for groups of said rotors to initially start the spinning thereof and automatically reversed and cut out at predetermined intervals by the switch mechanism, an electric current supply from the generator mechanism to a distributing station, and a normally open switch arranged in the current supply and having a wind foil controlling the same.

2. In a wind harness of the character described, a fixed circuitous course, a plurality of spinning rotors movable over the course, electric generating mechanism associated with the rotors, wind controlled switch mechanism operated with the generator mechanism, a motor for groups of said rotors to initially start the spinning thereof and automatically reversed and cut out at predetermined intervals by the switch mechanism, an electric current supply from the generator mechanism to a distributing station, a normally open switch arranged in the current supply, normally collapsed means and automatically operated by the wind for actuating the last named switch and mobile trucks carrying the rotors.

3. In a wind harness of the character described, a fixed circuitous course, a plurality of spinning rotors movable over the course, electric generating mechanism associated with the rotors, wind controlled switch mechanism operated with the generator mechanism, a motor for groups of said rotors to initially start the spinning thereof and automatically reversed and cut out at predetermined intervals by the switch mechanism, an electric current supply from the generator mechanism to a distributing station, a normally open switch arranged in the current supply, normally collapsed means and automatically operated by the wind for actuating the last named switch, mobile trucks carrying the rotors, and means arranged in the course and operative on the generating mechanism to actuate the same on travel of the trucks about the course.

4. In a wind harness of the character described, a fixed circuitous course, a plurality of spinning rotors movable over the course, electric generating mechanism associated with the rotors, wind controlled switch mechanism operated with the generator mechanism, a motor for groups of said rotors to initially start the spinning thereof and automatically reversed and cut out at predetermined intervals by the switch mechanism, an electric current supply from the generator mechanism to a distributing station, a normally open switch arranged in the current supply, normally collapsed means and automatically operated by the wind for actuating the last named switch mobile trucks carrying the rotors, means arranged in the course and operative on the generating mechanism to actuate the same on travel of the trucks about the course, and mountings on the trucks for supporting the spinning rotors thereon.

5. In a wind harness of the character described, a fixed circuitous course, a plurality of spinning rotors movable over the course, electric generating mechanism associated with the rotors, wind controlled switch mechanism operated with the generator mechanism, a motor for groups of said rotors to initially start the spinning thereof and automatically reversed and cut out at predetermined intervals by the switch mechanism, an electric current supply from the generator mechanism to a distributing station, a normally open switch arranged in the current supply, normally collapsed means and automatically operated by the wind for actuating the last named switch, mobile trucks carrying the rotors, means arranged in the course and operative on the generating mechanism to actuate the same on travel of the trucks about the course, mountings on the trucks for supporting the spinning rotors thereon, and driving connections between the rotors and said motors.

6. In a wind harness of the character described, a fixed circuitous course, a plurality of spinning rotors movable over the course, electric generating mechanism associated with the rotors, wind controlled switch mechanism operated with the generator mechanism, a motor for groups of said rotors to initially start the spinning thereof and automatically reversed and cut out at predetermined intervals by the switch mechanism, an electric current supply from the generator mechanism to a distributing station, a normally open switch arranged in the current supply, normally collapsed means and automatically operated by the wind for actuating the last named switch, mobile trucks carrying the rotors, means arranged in the course and operative on the generating mechanism to actuate the same on travel of the trucks about the course, mountings on the trucks for supporting the spinning rotors thereon, driving connections between the rotors and said motors, and a stand arranged for supporting the switch in the current supply and also the last named means to have the same confront the wind accordingly to the course thereof.

7. In a wind harness of the character described, a fixed circuitous course, a plurality of spinning rotors movable over the course, electric generating mechanism associated with the rotors, wind controlled switch mechanism operated with the generator mechanism, a motor for groups of said rotors to initially start the spinning thereof and automatically reversed and cut out at predetermined intervals by the switch mechanism, an electric current supply from the generator mechanism to a distributing station, a wind operated normally open switch arranged in the current supply, mobile trucks carrying the rotors, means arranged in the course and operative on the generating mechanism to actuate the same on travel of the trucks about the course, mountings on the trucks for supporting the spinning rotors thereon, driving connections between the rotors and said motors, a stand arranged for supporting the switch in the current supply to have the same confront the wind accordingly to the course thereof, and a normally collapsed windfoil carried by the stand and associated with the last named switch.

CLYDE M. EVANS.